UNITED STATES PATENT OFFICE 2,401,897

PREPARATION OF TETRAFLUOROETHYLENE

Anthony F. Benning, Woodstown, and Frederick B. Downing, Penns Grove, N. J., and Roy J. Plunkett, Wilmington, Del., assignors to Kinetic Chemicals, Inc., Wilmington, Del., a corporation of Delaware No Drawing. Application April 4, 1940, Serial No. 327,822

2 Claims. (Cl. 260—653)

This invention relates to a process for the preparation of tetrafluoroethylene.

Objects of this invention are to prepare tetrafluoroethylene, $C_2F_4$, to prepare it by an improved process which does not produce appreciable quantities of by-products, and which gives better yields than processes described in the prior art.

It is reported in the literature (Henne, J. A. C. S. 56, 1727–8) that the preparation of $C_2F_4$ from $C_2F_4Cl_2$ by use of zinc in absolute alcohol proceeds very slowly, necessitating the use of high temperatures and high pressures, that the product is obtained only in low yields, and that considerable quantities of ethylene are produced.

We have found that by the use of a reducing agent comprising highly active zinc dust, on symmetrical tetrafluorodichloroethane in methyl alcohol solvent, we obtain $C_2F_4$ under relatively mild conditions in good yields and without the simultaneous formation of ethylene, ethyl ether and other undesired by-products. The process involves the mixing of a selected amount of active zinc dust, organic solvent and symmetrical tetrafluoro dichloro ethane in an agitated pressure vessel. The temperature is raised to about 125° C. at which the reaction produces tetrafluoroethylene smoothly, which can be continuously removed from the reactor. Further description of the process is described in the following examples, which are for purposes of illustration only:

Example I

A 2 liter steel cylinder equipped with an electric heater and reflux condenser was charged with 500 grams of active zinc dust, 450 grams of methanol, and 175 grams of $C_2F_4Cl_2$. The mixture was heated to about 100° C. for five hours and the pressure maintained at approximately 200 lbs. gauge by releasing the reaction products through the reflux condenser. The gases which were so evolved consisted of $C_2F_4$ and unreacted $C_2F_4Cl_2$. After separation of the unreacted starting material, the product was found to be about 98% $C_2F_4$.

Example II

A horizontal steel agitated autoclave was charged with 25 parts of zinc dust, 20 parts of $C_2F_4Cl_2$ and 10 parts of absolute alcohol. The charge was heated to about 125–130° C. and was held at this temperature for 16 hours. The pressure rose rapidly to 700 lbs. gauge and was maintained at 500 to 600 lbs. gauge during the heating period by removal of the products formed. At the conclusion of the heating period the product was removed and $C_2F_4$ better than 95% purity was obtained. No ethylene was detected in the reaction products.

Results similar to those described in Example II have been obtained by operation in each of the solvents, methyl alcohol, aqueous methyl alcohol, acetone, pyridine, and dioxane. The reaction can be operated between temperature of about 75° C. to about 150° C. However, we prefer to operate in the range of about 125–135° C. The operation is preferably conducted under superatmospheric pressure to prevent the vaporization and removal of the chlorofluoro ethane with the desired $C_2F_4$. This may be accomplished in practice by maintaining the reaction under considerable pressure, 400 to 700 lbs. per sq. in., or by venting the product through a reflux condenser which will return the unreacted halo-ethane.

The zinc dust used for this reaction should be of a form having a per cent active zinc, as determined by the ferric alum method (Rosin, "Reagent Chemicals and Standards," Van Nostrand, 1937), over about 90%. Zinc dust which has been produced by electrical sputtering, vapor condensation or other means can be used provided it has an activity of over about 90% as indicated above. Also used are solvents such as methyl alcohol, pyridine, and dioxane, which cannot be dehydrated by the process. Solvents other than methyl alcohol, pyridine, and dioxane may be used, including a mixture such as methyl alcohol containing small quantities of water, provided only that they themselves are not reduced by zinc dust or susceptible to dehydration by the action of the anhydrous zinc chloride formed during the reduction.

The invention is susceptible of changes in operating conditions and materials. The haloethane used depends upon the fluoro-ethylene desired, the process being useful in the preparation of a number of fluoro and fluorochloro ethylenes, such as $CH_2=CF_2$, $CFCl=CFCl$, $CH_2=CHF$, $CHF=CHF$.

Among the advantages of the invention are the use of a cheap solvent, such as methyl alcohol, in an operation conducted at relatively low pressures and temperatures, giving yields higher than those reported in the prior art, without undesirable quantities of by-products.

As many apparently widely different embodiments of this invention may be made without departing from the spirit and scope thereof, it is to be understood that we do not limit ourselves to the specific embodiment thereof except as defined in the appended claims.

We claim:
1. The process of producing $C_2F_4$ from symmetrical $C_2F_4Cl_2$ which comprises enclosing symmetrical $C_2F_4Cl_2$ in a container holding zinc having at least 90% activity as determined by the ferric-alum method and methanol, and heating the mixture to about 100° C. at about 200 lbs. gauge pressure.

2. The process of producing $C_2F_4$ from symmetrical $C_2F_4Cl_2$ which comprises enclosing symmetrical $C_2F_4Cl_2$ in a container holding zinc having at least 90% activity as determined by the ferric-alum method and methanol, and heating the mixture to 75°–150° C. at a superatmospheric pressure high enough to prevent substantial vaporization and removal of chlor-fluoro-ethane.

ANTHONY F. BENNING.
FREDERICK B. DOWNING.
ROY J. PLUNKETT.